US00RE50707E

(19) United States
(12) Reissued Patent
Wilcox

(10) Patent Number: US RE50,707 E
(45) Date of Reissued Patent: Dec. 23, 2025

(54) PRODUCE SHIPPING CONTAINER

(71) Applicant: Arena Packaging, LLC, Rochester, NY (US)

(72) Inventor: Donald E. Wilcox, Rochester, NY (US)

(73) Assignee: Arena Packaging, LLC, Rochester, NY (US)

(21) Appl. No.: 17/245,145

(22) Filed: Apr. 30, 2021

Related U.S. Patent Documents

Reissue of:
(64) Patent No.: 10,273,052
Issued: Apr. 30, 2019
Appl. No.: 15/387,844
Filed: Dec. 22, 2016

U.S. Applications:
(60) Provisional application No. 62/387,285, filed on Dec. 23, 2015.

(51) Int. Cl.
*B65D 25/00* (2006.01)
*B65D 6/18* (2006.01)
(Continued)

(52) U.S. Cl.
CPC ..... *B65D 25/005* (2013.01); *B65D 11/1833* (2013.01); *B65D 21/0201* (2013.01); *B65D 21/086* (2013.01); *B65D 85/34* (2013.01)

(58) Field of Classification Search
CPC ..... A01F 25/14; B65B 25/04; B65B 25/046; B65D 11/184; B65D 11/1833;
(Continued)

(56) References Cited

U.S. PATENT DOCUMENTS 3,544,146 A 12/1970 Asenbauer
3,797,870 A 3/1974 Beckman
(Continued)

FOREIGN PATENT DOCUMENTS

CA 1319118 C 6/1993
CN 203877100 10/2014
(Continued)

OTHER PUBLICATIONS

S-signature requirements. (Year: 2020).*
(Continued)

*Primary Examiner* — Terrence R Till
*Assistant Examiner* — Glenn K Dawson
(74) *Attorney, Agent, or Firm* — Simpson & Simpson, PLLC; Jeffrey B. Powers

(57) ABSTRACT

A container having walls, one having a projection including a hook and an exterior surface opposite the hook having an external contact location, the hook extending away from the contact surface, the contact location disposed interiorly of the hook. The container includes a door, and a latch coupled to the door by a spring. The latch comprises a catch and a binding arm, and has a contact surface positioned to fit the projection between the catch and contact surface. The latch has a locked position in which the catch and hook maintain the door in the closed position, and an unlocked position in which the door is movable. The spring biases the latch into the locked position. Sufficient pressure on the latch overcomes the biasing to achieve the unlocked position, to allow the open position to be attained. When in the locked position, the contact surface faces the contact location.

11 Claims, 9 Drawing Sheets

AMENDED

(51) Int. Cl.
*B65D 21/02* (2006.01)
*B65D 21/08* (2006.01)
*B65D 85/34* (2006.01)

(58) Field of Classification Search
CPC ..... B65D 21/0209; B65D 21/086; B65D 25/005; B65D 85/34; B65D 85/345; E05C 1/145
USPC ..... 217/36, 40; 220/4.29, 7, 9.2, 9.3; 53/475
See application file for complete search history.

(56) References Cited

U.S. PATENT DOCUMENTS 3,878,980 A 4/1975 Crane
3,888,525 A 6/1975 Kousens
3,935,990 A 2/1976 Crane
3,935,991 A 2/1976 Crane
4,192,430 A * 3/1980 Cornou ..... B65D 19/18 220/1.5
4,284,299 A 8/1981 Kelly
4,492,396 A 1/1985 Luke et al.
4,542,924 A 9/1985 Brown et al.
4,817,799 A 4/1989 Gregerson et al.
4,917,255 A 4/1990 Foy et al.
4,917,413 A 4/1990 Jason et al.
4,967,927 A 11/1990 Reiland
5,100,015 A 3/1992 Vanderstuyf
5,121,952 A 6/1992 Jason
5,147,061 A 9/1992 Karpisek
5,161,709 A 11/1992 Oestreich
5,199,592 A 4/1993 Reiland et al.
5,275,302 A 1/1994 Uitz
5,289,933 A 3/1994 Streich et al.
5,474,197 A 12/1995 Hillis et al.
5,501,356 A 3/1996 Billingham
5,583,612 A 12/1996 Schell et al.
5,617,711 A 4/1997 Rodriguez et al.
5,727,711 A 3/1998 Émond
5,755,350 A 5/1998 Marthaler
6,029,840 A * 2/2000 Brauner ..... B65D 11/1833 220/6
6,203,077 B1 3/2001 Schlack
6,220,637 B1 4/2001 Kierl
6,283,319 B1 9/2001 Hillis et al.
6,290,081 B1 9/2001 Merey
6,293,418 B1 9/2001 Ogden et al.
6,373,690 B1 4/2002 Buican
6,484,898 B2 11/2002 Hillis et al.
6,595,605 B1 7/2003 Babcock et al.
6,712,404 B2 3/2004 Davies
6,776,300 B2 8/2004 Walsh et al.
6,834,766 B2 12/2004 Lin et al.
6,868,979 B2 3/2005 Rader
6,918,508 B2 7/2005 Hwang
6,921,227 B1 7/2005 De Jong
7,048,464 B2 5/2006 Ronnquist
7,063,223 B2 6/2006 Iwahara
7,198,149 B2 4/2007 Gelardi
7,264,122 B2 9/2007 Koefelda et al.
7,273,203 B2 9/2007 Carnevali
7,416,092 B2 8/2008 Dubois et al.
7,484,634 B2 2/2009 Apps
7,617,947 B2 11/2009 Schafer
7,828,167 B2 11/2010 Nolan
7,896,184 B2 3/2011 Meers
7,963,494 B2 6/2011 Hsiung et al.
8,020,517 B2 9/2011 Seay
8,052,000 B2 11/2011 Apps
8,066,147 B2 11/2011 Meers et al.
8,109,402 B2 2/2012 Hartwall
8,261,923 B2 9/2012 Blanchard
8,413,831 B2 4/2013 Nolan
8,469,224 B2 6/2013 Orgeldinger
8,631,956 B2 1/2014 Dowd
8,640,912 B2 2/2014 Orgeldinger
8,651,310 B2 2/2014 Orgeldinger
8,662,333 B2 3/2014 Orgeldinger
8,727,158 B2 5/2014 Nolan
8,757,412 B2 6/2014 Sommer et al.
8,807,365 B2 8/2014 Orgeldinger
8,820,560 B2 9/2014 Nolan
8,875,924 B2 11/2014 Orgeldinger
8,915,397 B2 12/2014 Petersen et al.
8,950,613 B2 2/2015 Nolan
9,278,775 B2 3/2016 Meers et al.
9,296,557 B2 3/2016 Petersen et al.
9,403,621 B2 8/2016 Dubois et al.
9,415,898 B2 8/2016 Nolan
9,422,082 B2 8/2016 Nolan et al.
10,370,145 B2 8/2019 Baltz et al.
2001/0038011 A1 11/2001 Hillis
2007/0084864 A1 4/2007 Thrush et al.
2007/0278223 A1 12/2007 Ficker
2008/0264938 A1 10/2008 Tibbels et al.
2008/0308447 A1* 12/2008 Boland ..... A47B 87/0284 206/512
2009/0101640 A1 4/2009 Hadar
2010/0072198 A1 5/2010 Roemer et al.
2011/0139775 A1 6/2011 Nolan
2011/0215105 A1* 9/2011 Dubois ..... B65D 11/18 220/682
2011/0240657 A1 10/2011 Orgeldinger
2013/0001223 A1* 1/2013 Cavalcante ..... B65D 11/1833 220/4.01
2013/0193153 A1 8/2013 Baltz et al.
2014/0252018 A1 9/2014 Nolan
2016/0039598 A1 2/2016 Wilcox et al.
2018/0072454 A1* 3/2018 Wilcox ..... B65D 21/0209

FOREIGN PATENT DOCUMENTS

DE 102006005873 8/2007
EP 0281422 A2 9/1988
EP 2371740 10/2011
WO 8607406 12/1986
WO 8607406 A1 12/1986
WO 9824151 6/1998
WO 9824151 A1 6/1998
WO 03/043911 A1 5/2003
WO 03043911 5/2003
WO 2014176292 10/2014
WO 2014176292 A1 10/2014
WO 2015134067 9/2015
WO 2015134067 A1 9/2015

OTHER PUBLICATIONS

Provisional U.S. Appl. No. 62/387,285, filed Dec. 23, 2015.
PCT International Search Report, Form PCT/ISA/210, International Application No. PCT/US16/68192, International filing date Dec. 22, 2016, dated Mar. 2017, pp. 1-8.

* cited by examiner

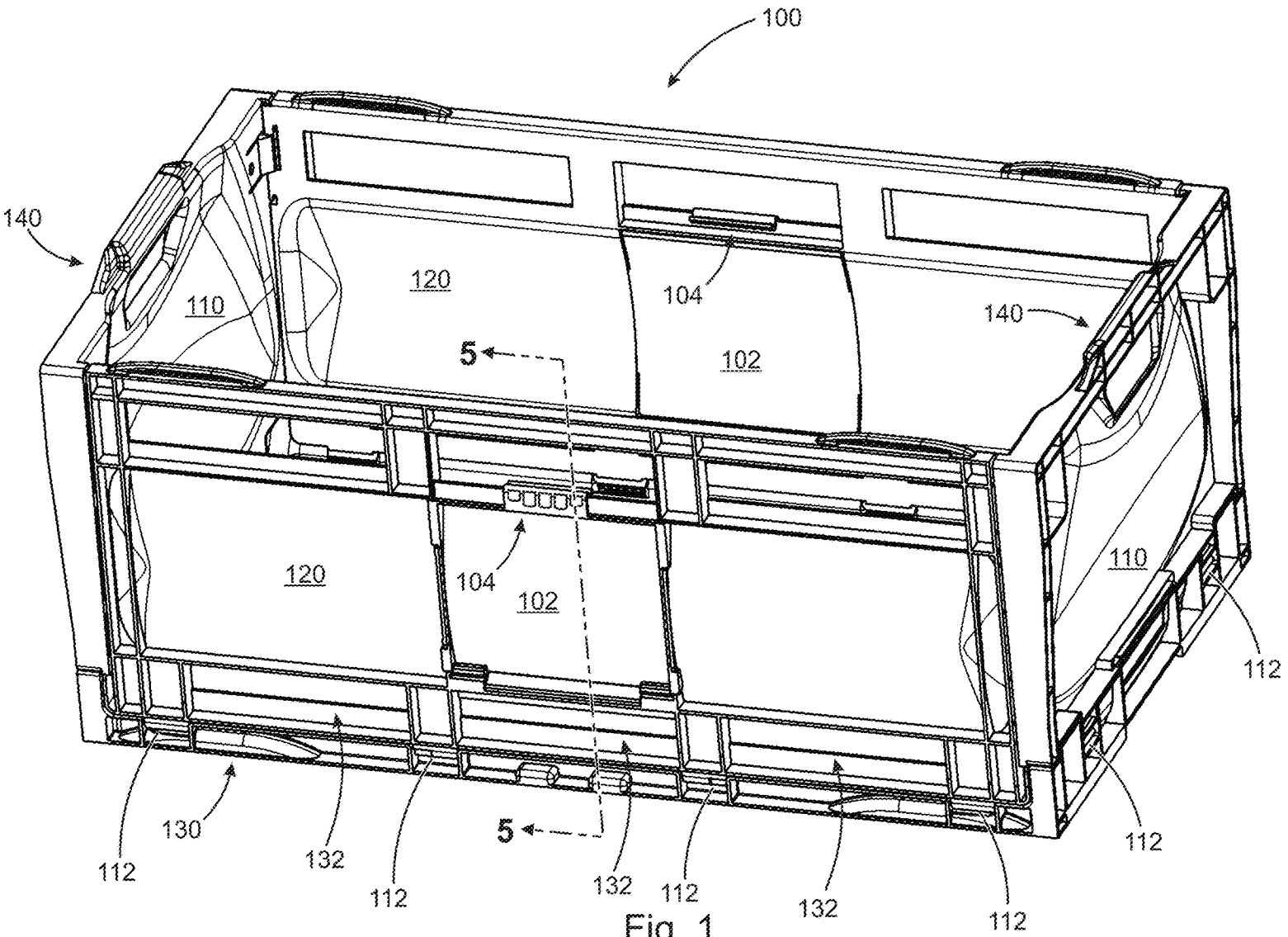
Fig. 1
AMENDED

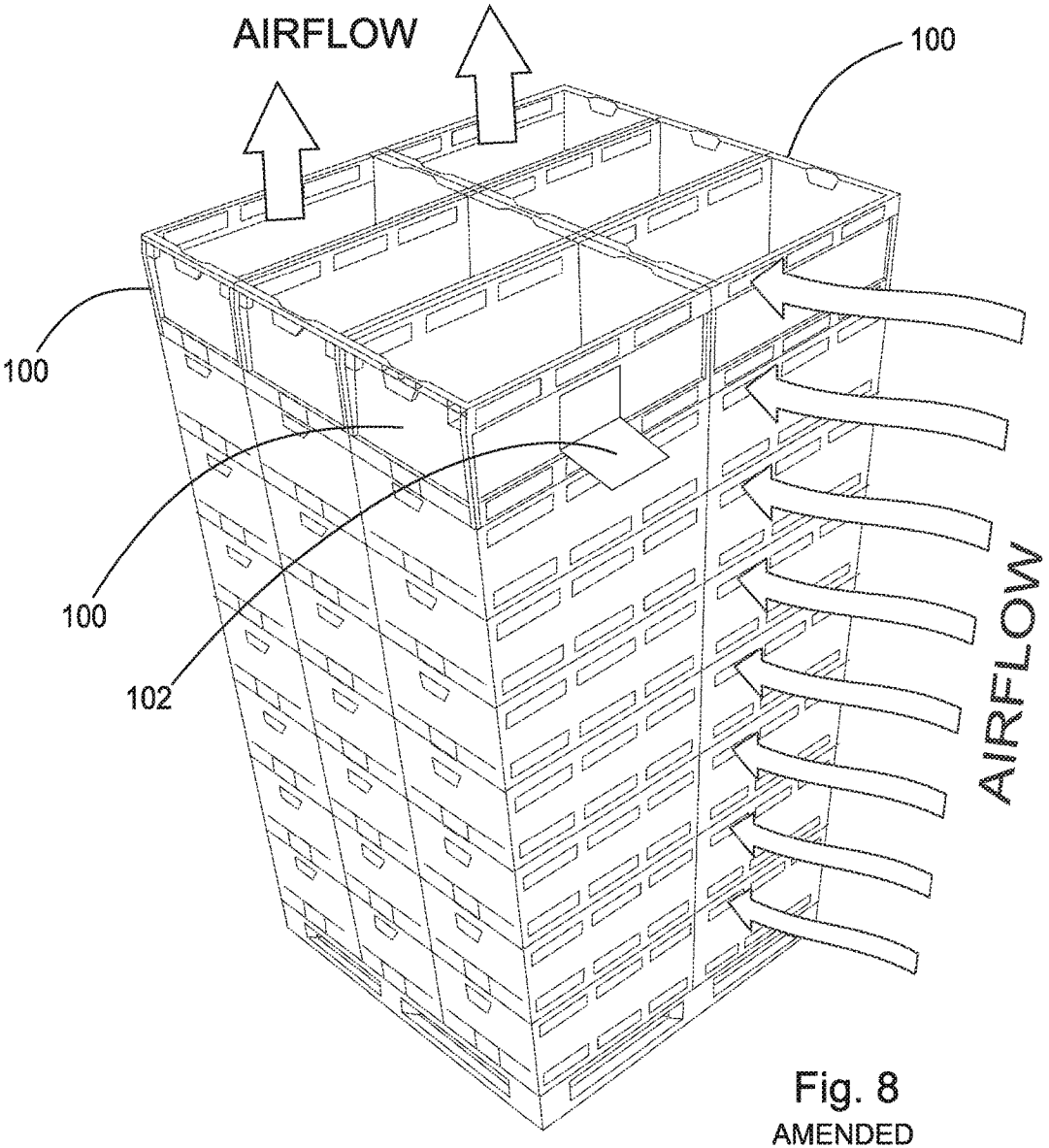
Fig. 8
AMENDED

PRODUCE SHIPPING CONTAINER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION

The present application claims the benefit of U.S. Provisional Application No. 62/387,285 filed on Dec. 23, 2015 having a title PRODUCE SHIPPING CONTAINER under 35 U.S.C. § 119(e), the substance of said application is hereby incorporated by reference in its entirety.

FIELD OF THE INVENTION

Produce shipping containers, especially containers for shipping bananas.

BACKGROUND OF THE INVENTION

Bananas are harvested from trees in tropical growing regions such as Central and South America. Export bananas are picked green, shipped to distribution centers in destination countries, and delivered to retail stores in a state of ripeness appropriate for retail sale. Growers conventionally pack bananas in covered, corrugated cardboard boxes containing about 40 pounds of bananas per box. Filled boxes are placed on pallets in eight layers, each layer including 5 or 6 boxes. Bananas are refrigerated to between 13.5° and 15° C. (56.3 and 59.0° F.) during transport to suspend the ripening process ("put the bananas to sleep"). This allows bananas to reach grocery stores without being overripe.

Pallets of cooled ("sleeping") bananas are loaded onto ships for transport from growing regions to consuming regions. Temperature continues to be controlled throughout shipment to distribution centers in the consuming regions. Acceptance testing usually occurs at the distribution center. Upon arrival, bananas on a given pallet are inspected to determine if the shipment will be accepted or rejected. A typical inspection involves sampling bananas in 3-4 boxes on each pallet. The bananas are selected at different layers and sides of the 30-48 box arrangement to determine the quality of bananas and their state of ripeness. When shipping in corrugated boxes, a hole must be cut in the selected boxes with a knife. One or more bananas are removed through the hole and inspected. Attributes tested include physical appearance, size, sweetness, and temperature.

Accepted pallets of bananas are moved to a ripening room. There the temperature of the bananas is raised and the bananas are exposed to ethylene gas to restart the ripening process ("waken the bananas"). The ripening process continues in the ripening room for about 3-5 days. After sufficient ripening, the pallets are loaded onto a truck at the distribution center for delivery to retail stores. Temperature continues to be controlled. To lengthen shelf life at the stores, boxes are de-stacked from each pallet, box covers are removed, and the uncovered boxes are reloaded onto the pallet in a cross-stacked arrangement (each box has its length extending in a direction perpendicular to the length of the box on which it is located). Cross-stacking provides better airflow over the bananas, minimizing over-ripening by allowing better release of heat and ethylene gas generated during ripening.

The current transport process for bananas has several disadvantages. During the inspection process, the cutting of containers may result in direct damage to the bananas from the cutting implement as a container is cut, and indirect damage to the bananas may result from structural weakness cause by the cutting of the boxes, which may result in the crushing of bananas during transportation. Also, manipulation of boxes at the retail store to achieve the cross-stacked arrangement is labor intensive.

While plastic containers as an alternative to corrugated cardboard boxes have been produced, they have had some, although limited commercial success for transporting of bananas. They have been relatively heavy and had rigid construction. One proposed plastic container, described in published PCT Application WO2015134067, has a light weight construction giving the box a relatively high flexibility similar to corrugated cardboard which is desirable in many applications.

There remains a need for a plastic container having an access door that is easily opened to facilitate the inspection process and to facilitate the release of heat and ethylene gas that is generated during the ripening process. The box should also provide access to the contents of the container without compromising the structural integrity of the box when the box is subjected to the substantial forces resulting from the stacking and transportation of multiple layers of containers. For example, the contents of the container should not be damaged and the access door should not inadvertently open during transportation. Additionally, it is typically desirable that the opening mechanism and door should fit within the profile of the wall to facilitate manipulation of containers on a pallet and decrease the likelihood that the contents of the container will be damaged.

BRIEF SUMMARY OF THE INVENTION

A first aspect of the invention is directed to a produce container having an interior for maintaining produce. The container comprises a base, two endwalls and two sidewalls, each of the endwalls and sidewalls are coupled to the base, at least one of the sidewalls having a first projection and a second projection. Each projection extends transverse to an exterior surface of the at least one sidewall or endwall. Each projection comprises i) a hook and ii) an external surface opposite the hook including an external contact location having a tangent that is transverse to the wall, the hook extending in a direction away from the contact location, the contact location being disposed interiorly of the hook. The container further comprises a door movably coupled to the sidewall or endwall, the door movable from a closed position to an open position, and a latch coupled to the door by at least one spring at an end of the door. The latch comprises a first clasp and a second clasp. Each clasp comprises a catch and a binding arm connected to the catch and having a contact surface. For each clasp, the catch is separated from the contact surface by a distance so that a corresponding one the first projection and second projection fits between the catch and the contact surface when the door is in a closed position. The first clasp and the second clasp are separated from another along the end. The latch also comprises an actuation bar extending between the first clasp and the second clasp, and a bridge extending between the first clasp and the second clasp. The bridge is separated from the actuation bar. The latch has a locked position in which the catches interface with their corresponding hooks to maintain the door in the closed position and prevents the external motion. The latch also has an unlocked position in which the door is externally movable from the closed position to the open position. The at least one spring is configured and positioned to bias the latch into the locked position, and configured such that sufficient pressure on the actuation bar (also referred to as a finger press) overcomes the biasing to move the catches to an unlocked position in which the catches do not interface with the corresponding hooks. In the unlocked position the catches are positioned to allow the door to externally rotate to attain the open position. When the latch is in the locked position, each of the contact surfaces faces or contacts its corresponding contact location, such that it contacts or is able to contact the corresponding location to inhibit an opening force on the door (such as a force on the interior of the door caused by the contents of the container) from moving the latch from the locked position to the unlocked position.

In some embodiments, each of the endwalls and sidewalls is coupled to the base by at least one hinge. In some embodiments, the access door is coupled to a sidewall. In some embodiments, the hooks extend downward. The access door may be coupled to the at least one of the endwalls and the sidewalls by at least one hinge, whereby the door is moved between the closed position and the open position by external rotation.

In some embodiments, the hinges are connected to a bottom end of the access door.

The contact locations may be substantially perpendicular to the at least one of the sidewalls and the endwalls.

For example, the actuation bar and the bridge may be separated from one another by about 2 mm to 2 cm.

The container may constitute one container in an arrangement of containers on a pallet. The container may be in a combination with a plurality of other containers to form an arrangement on a pallet.

The arrangement may be a multilayer 6-down arrangement.

Another aspect of the invention is directed to a produce container having an interior for maintaining produce. The container comprises a base, two endwalls and two sidewalls. Each endwall and sidewall is coupled to the base. At least one of the endwalls or sidewalls has a projection extending transverse to an exterior surface of the at least one endwall or sidewall. The projection comprises i) a hook extending from a surface thereof and ii) an exterior surface opposite the hook including an external contact location having a tangent that is transverse to the at least one of the endwalls and sidewalls. The hook extends in a direction away from the contact surface. The contact location is disposed interiorly of the hook.

The container also comprises a door movably coupled to the at least one of the sidewalls or endwalls, the door movable from a closed position to an open position. The container also comprises a latch, coupled to the door by a spring. The latch comprises a catch and a binding arm. The binding arm is connected to the catch and has a contact surface. The contact surface is separated from the catch by a distance such that the projection fits between the catch and the contact surface when the door is in the closed position. The latch has a locked position in which the catch interfaces with the hook to maintain the door in the closed position, and an unlocked position in which the door is movable from the closed position to the open position. The spring biases the latch into the locked position when the door is in the closed position. Sufficient pressure on the latch overcomes the biasing to move the catch to an unlocked position in which it does not interface with the hook, thereby allowing the door to attain the open position. When the latch is in the locked position, the contact surface faces or contacts the contact location, such that it contacts or is able to contact the corresponding location to inhibit an opening force on the door (such as a force on the interior of the door caused by the contents of the container) from moving the latch from the locked position to the unlocked position.

As used herein, terms such as "down" and "downward" refer to a direction toward the base of a container, and the term "bottom" refers to the base side of the container. Terms such as "up" and "upward" refer to a direction away from the base of a container, and the term "top" refers to the side opposite the base.

BRIEF DESCRIPTION OF THE SEVERAL VIEWS OF THE DRAWING

The nature and mode of operation of the present invention will now be more fully described in the following detailed description of the invention taken with the accompanying drawing figures, in which:

FIG. 1 is a perspective view of an example of a reusable plastic container (RPC) having access doors and latches according to aspects of the present invention, the view taken from above the container;

FIG. 8 is a perspective view of an arrangement of RPCs, each container being as shown in FIG. 1 with a representative one of the containers shown with its access door open, the door being open to enhance air flow to the interior of the container arrangement.

DETAILED DESCRIPTION OF THE INVENTION

Figure 2:
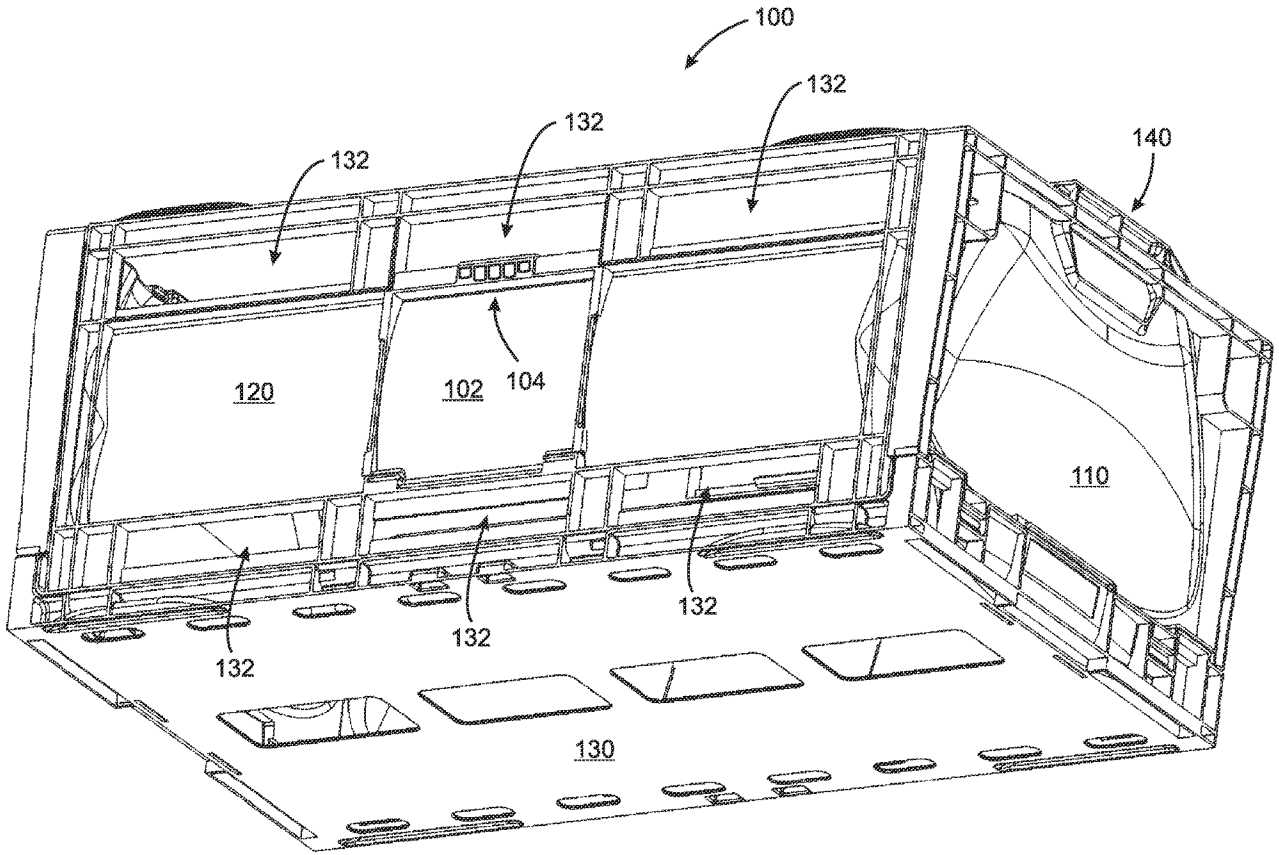
FIG. 2 is a perspective view of an example of a RPC according to aspects of the present invention, the view taken from below the container.

FIGS. 1 and 2 are perspective views of an example of a reusable plastic container 100 (also referred to herein as an RPC 100 or container 100) having two access doors 102 (also referred to herein as doors 102) and a latch 104 according to aspects of the present invention, the views are taken from above and below container 100, respectively. Container 100 comprises two endwalls 110 and two sidewalls 120 which are coupled to a base 130. Endwalls 110 and sidewalls 120 are collectively referred to herein as walls. The endwalls and sidewalls may be rigidly attached to base 130 or coupled to the base by one or more hinges [(not shown)]*112*. Hinges *112* allow the walls of a box to attain an erect state (as shown in FIG. 1) in which the walls extend vertically from the base when the base is horizontally aligned, and the walls are locked in position to permit receipt of produce inside the container, and a collapsed state (not shown) in which the side walls are folded down on the base so as to be substantially parallel with the base and thereby form a more compact configuration which is useful, for example, during the return of empty RPCs. Handles 140 allow for easy movement of container 100 and any contents therein. A plurality of vents 132 in sidewalls 110 and/or endwalls 120 may be present to facilitate airflow to the interior of the container as described above. Although container 100 is shown as having an access door on both sidewalls 110, according to aspects of the invention, at least one of the sidewalls 120 or endwalls 110 has an access door with a latch as described herein. Further details of the latch are provided below.

Figure 3:
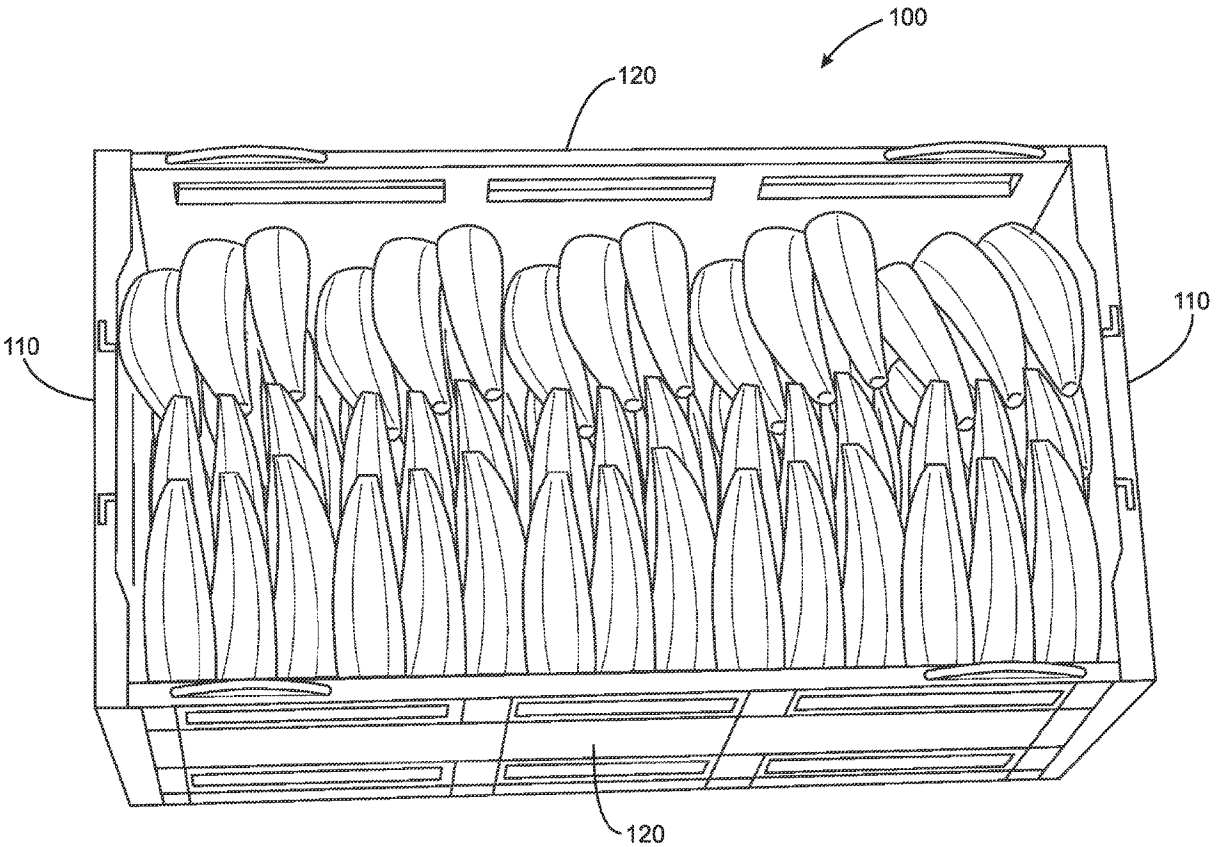
FIG. 3 is a top view of the RPC of FIG. 1 filled with produce.

Containers may have a length and width (i.e., footprint) similar to any known banana container or any other suitable length and width to fit on a standard GMA pallet or other pallet suitable for shipping produce. Container 100 is molded from a plastic material, for example polypropylene. Suitable plastic materials include, but are not limited to, polyethylene, polypropylene, polyvinyl chloride, polyurethane, polyester, epoxy resin, phenolic resin, polystyrene, polycarbonate, combinations thereof and the like FIG. 3 is a top view of RPC 100 of FIG. 1 filled with produce. For example the produce may be bananas, or other food which requires ripening while in a shipping container such as peaches. An RPC according to aspects of the present invention may hold bananas, other produce, or other food or non-food materials in the containers interior (i.e., in the space between the four walls 110, 120 and base 130 (shown in FIG. 2)).

Figure 4:
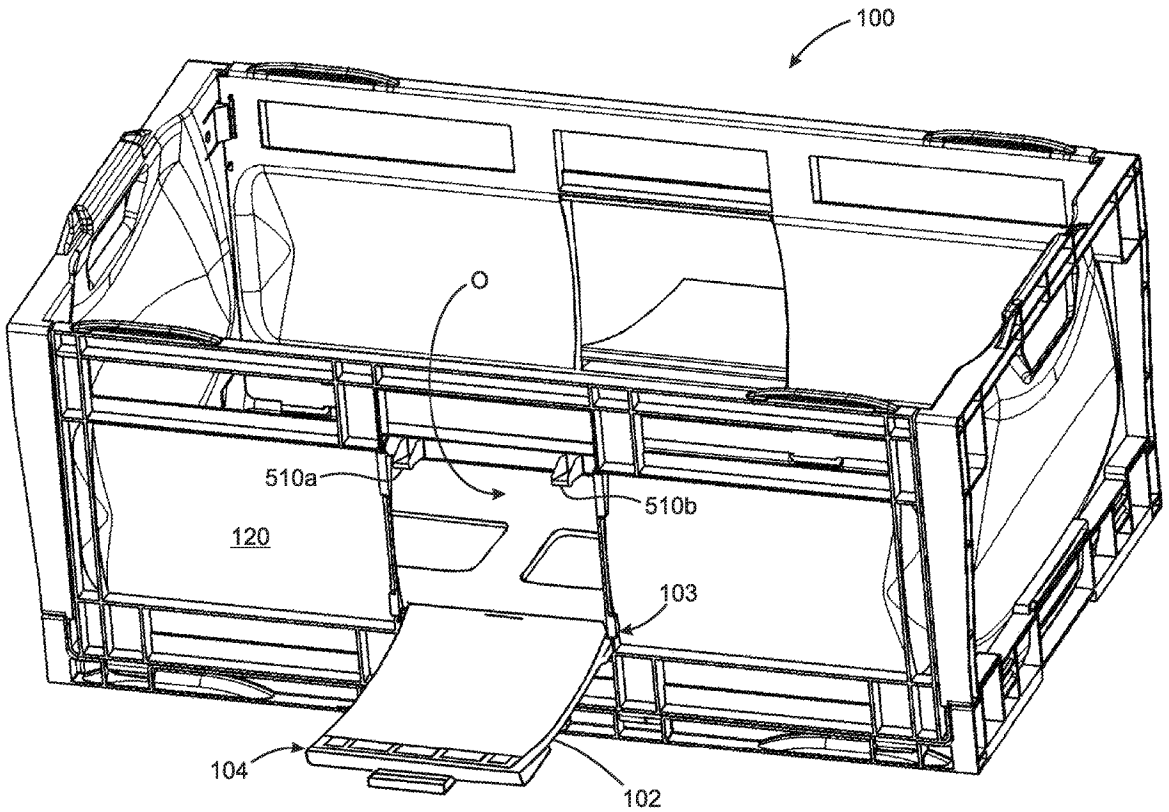
FIG. 4 is a perspective view of the container of FIG. 1 with an access door in an open position.

FIG. 4 is a view of sidewall 120 of container 100 of FIG. 1 coupled to access door 102, the door being in an open position. In the illustrated embodiment, access door 102 is coupled to a wall using one or more hinge 103. In some embodiments, it is advantageous that the door open to form greater than a 90-degree angle with the wall on which is coupled (as measured to the interior surface of the door). In some embodiments, the angle with the wall is at least 135 degrees.

Figure 5:
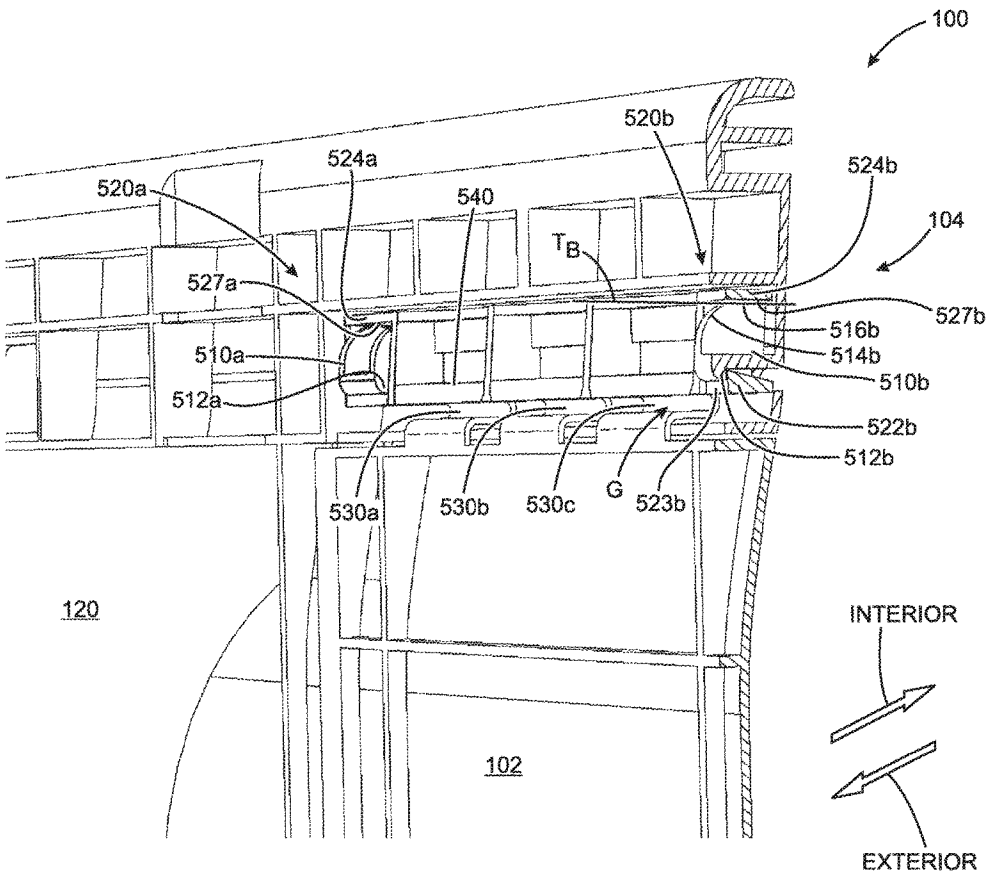
FIG. 5 is a cross section of a partial perspective view of the container of FIG. 1 with a cross section taken at line 5-5 having an access door in a closed position, showing further detail of the sidewall, access door and latch.
Figure 6:
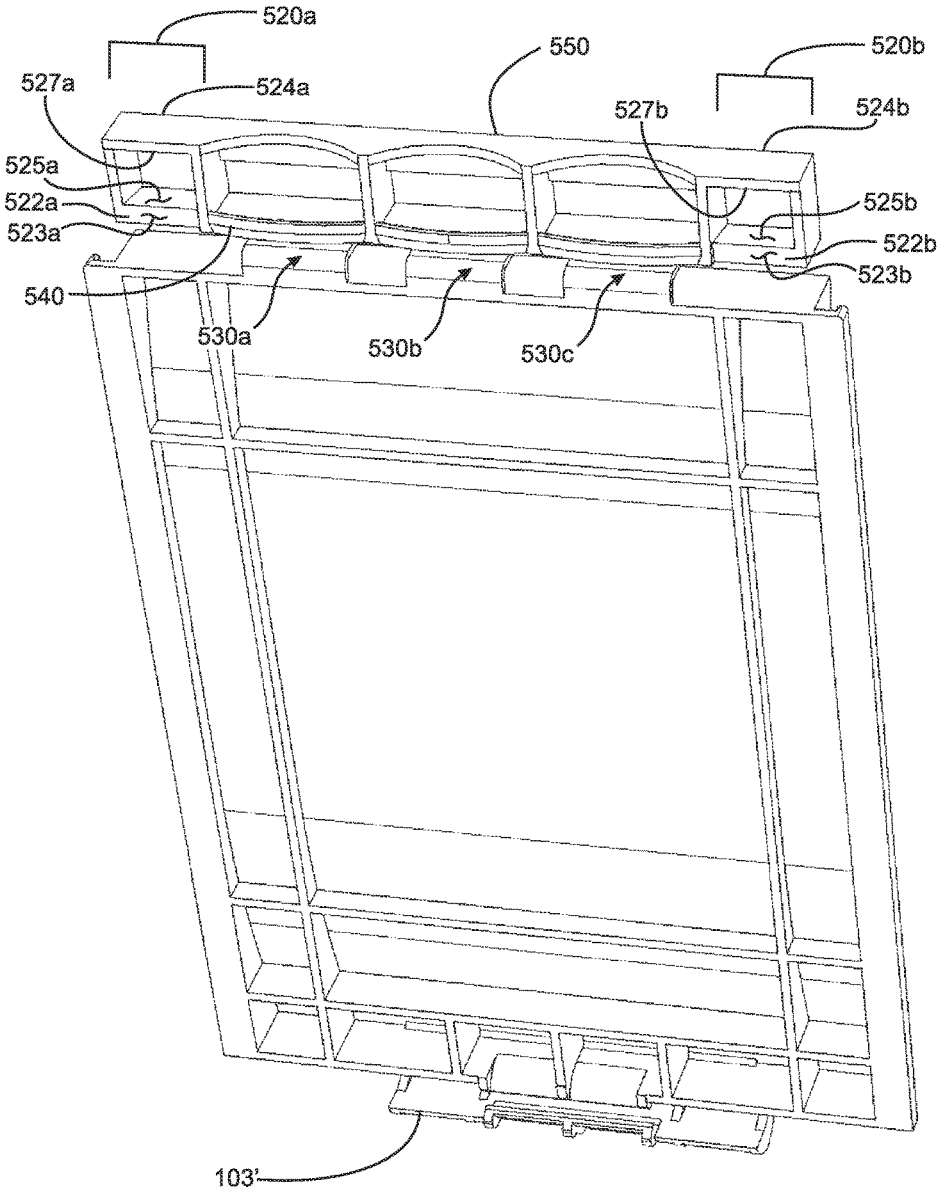
FIG. 6 is perspective view of an access door that has been removed from any walls of the container.
Figure 7:
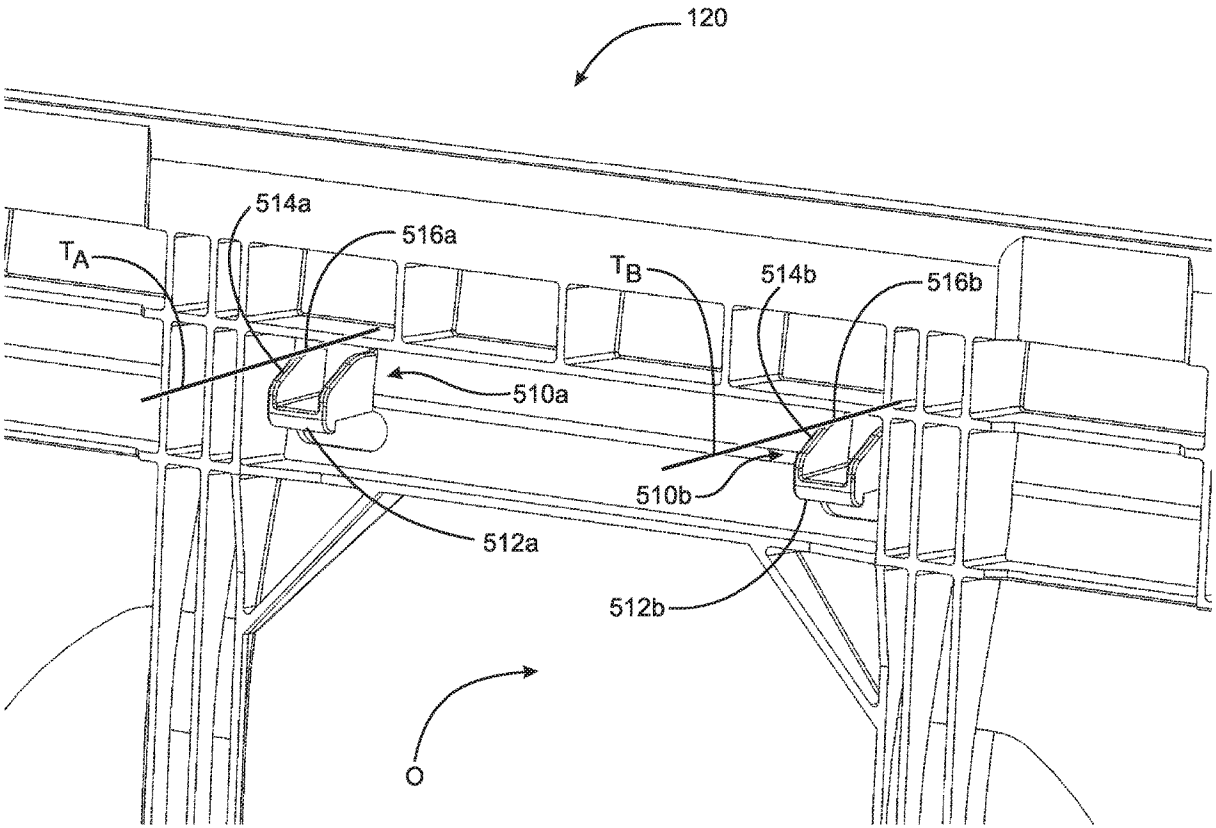
FIG. 7 is an expanded perspective view of a side wall of the container of FIG. 1 with the access door removed.

Container 100 with latch 104 will now be described further with reference to FIGS. 5-7. FIG. 5 is a cross section of a partial perspective view of sidewall 120 of container 100 of FIG. 1 with a cross section taken at line 5-5 with access door 102 in a closed position, showing further detail of sidewall 120, access door 102 and latch 104. FIG. 5 includes a cross section taken through door 102 (at projection 510b), latch 104 and side wall 120. FIG. 6 is perspective view of access door 102 when it is removed from any walls of the container. FIG. 7 is an expanded perspective view of side wall 120 of the container of FIG. 1 with the access door removed.

As shown, sidewall 120 has a first projection 510a and a second projection 510. Each projection extends transverse to an exterior surface of sidewall 120. Each projection 510a, 510b comprises a hook 512a, 512b and an external surface 514a, 514b opposite hooks 512a and 512b, respectively. External surfaces 514a, 514b include an external contact location 516a and 516b, respectively. Contact location 516a and 516b are disposed interiorly of [hook 511a and 511b] *hooks 512a and 512b*, respectively. Hooks 512a and 512b extend in a direction away from contact [surfaces] *locations* 516a and 516b, respectively. Contact locations 516a and 516b have a tangent $T_a$, $T_b$, respectively, that is transverse to the wall. In the illustrated embodiment, [hook 512 extends] *hooks 512a and 512b extend* downward from a bottom surface of [the] *a corresponding* projection *510a, 510b*, and external [surface 514] *surfaces 514a and 514b* and contact [location 516] *locations 516a and 516b* are on a top surface of [the ] *a corresponding* projection *510a, 510b*.

Door 102 is movably coupled to wall 120, door 102 being movable from a closed position (shown in FIG. 1) to an open position (shown in FIG. 4). In the closed position, the door contacts wall 120 around its perimeter to maintain any contents in the container and access to the interior of the container through the wall is prevented. In the open position, access to the inside of the container is permitted though the opening O in the sidewall 120 (e.g., to permit sampling or to facilitate air flow to or from the interior of the container).

In the illustrated embodiment, movable coupling is achieved by hinges 103 which permit external rotation of door 102 from the closed position to the open position. However latch 104 as disclosed herein may be used with other doors that move from a closed position to an open position using other types of movement such as external translation.

Also, although in the illustrated embodiment, hinges 103 are shown on the bottom of the door, the hinge may be located on a top or a side of the door. Although a door is shown as located on a sidewall 120, a door may alternatively (or additionally) be located on an endwall 110. Hinge component 103' is disposed at the bottom end of door 102.

Latch 104 comprises a first clasp 520a and a second clasp 520b. As described in greater detail below, each clasp interacts with a corresponding one of projections 510a, 510b to inhibit exterior motion of door 102 to maintain the door in a closed position. In the illustrated embodiment, two clasps and two corresponding projections 510a, 510b are used to maintain the door in a closed position. However, according to aspects of the present invention, one or more clasps may be present. The projections 510a, 510b are located at an opposite side of opening O from the hinges 103.

In embodiments where more than one clasp is present, first clasp 520a and second clasp 520b are separated from another. It will be appreciated that such a configuration inhibits angular motion of door 102 (such that the left or right sides of the door can become separated from wall 120) from forces such as would occur due to internal pressure being applied to the door by contents in the container. In some embodiments, it is advantageous that clasps 520a and 520b be located at the lateral extents of the door.

Each clasp comprises a catch 522a, 522b and a binding arm 524a, 524b. Each catch has an interface surface 523a, 523b.

Latch 104 is coupled to the door by one or more springs 530a, 530b, 530c (collectively referred to as spring 530; illustrated in the embodiment as bent cantilever springs each positioned to form a gap G between the top of the body of the spring and the bottom of actuation bar 540). Spring 530 biases catches 522a and 522b into a locked position. Although the springs are illustrated as cantilever springs, any suitable spring construction (e.g., a coil spring) capable of biasing the catches in the manner described herein may be used.

In the locked position, each of the interface surfaces 523a, 523b (on catches 522a, 522b) interfaces with its corresponding hook 512a, 512b to maintain door 102 in the closed position and prevents the external motion of door 102. In the illustrated embodiment, each catch is tapered such that the vertical thickness of the catch on the interior side of the catch is less than the vertical thickness of the catch on the exterior side of the catch (i.e., the catches are thickest at interface surface 523a, 523b) to form a ramped surface 525a, 525b. The ramped surfaces facilitate movement of the hooks 512a and 512b to a position where they contact interface surfaces 523a and 523b, respectively, as door 102 is closed to attain the locked position. It is to be appreciated that, prior to application of an opening force on the door, a gap may exist between one of the interface surfaces 523a, 523b and the corresponding hook, such that only upon application of the opening force, the interface surface and the hook contact one another to inhibit opening of the door.

An actuation bar 540 extends between and is connected to first clasp 520a and second clasp 520b. Typically, the actuation bar is beam-shaped, but may have some curve or contour such as contour to facilitate locating of fingers on the bar. The force on actuation bar 540 overcomes the biasing of the spring(s) 530 and causes flexure of the plastic clasps to move interface surfaces 523a, 523b of catches 522a, 522b out of the their interfacing position with corresponding hooks 512a and 512b. Accordingly, latch 104 is moved to an unlocked position in which door 102 is externally movable from its closed position to its open position.

In the illustrated embodiment, unlocking of latch 104 is achieved by compressing spring(s) 530 (such that gap G is reduced and the spring is flexed) by pressing actuation bar 540 in a downward direction. However in other embodiments (not shown), hooks 512a and 512b extend upward from a top surface of a projection instead of downward, and the external surface and contact location are on a bottom surface of the projection. It will be appreciated that in embodiments where the hook is on top and the contact location are on the bottom, unlocking of the latch will be achieved by stretching the spring as a result of pressing the actuation bar in an upward direction.

Binding arms 524a and 524b have corresponding contact surfaces 527a and 527b. The binding arm of each clasp is connected to the catch 522a, 522b of its corresponding clasp, such that contact surfaces 527a and 527b are separated from their corresponding catch 522a, 522b by a distance to permit a corresponding one of first projection 510a and second projection 510b to fit between the catch and the contact surface. The projections are positioned relative to the clasps such that, after the hook of a projection is moved past the catch, the spring 530 biases the catch toward the projection, as described above, to achieve the locked position.

When latch 104 is in the locked position, each contact surface 527a, 527b of the binding arm contacts its corresponding contact location 516a, 516b to inhibit an opening force on the door from moving latch 104 from the locked position to the unlocked position. It will be appreciated that an opening force on the door (e.g., a force on the interior of the door caused by the contents of the container) results in catches [525a, 525b] *522a, 522b* being pivoted and moved away from the projections which tends to move catches [525a and 525b] *522a and 522b* out of interface with hooks 523a and 523b. Contact locations 516a and 516b of projection [511a and 511b] *510a and 510b* press against contact surfaces 527a and 527b of binding arm, respectively, to inhibit pivoting of the catches and movement of the catches away from the projections and thereby inhibit force from the interior of the container from unlocking the latch and opening the door. It is to be appreciated that, prior to application of the opening force on the door, the contact surface and contact location face one another (as shown in FIG. 5) and a gap may exist between the contact surface and the contact location, such that upon application of the opening force, the contact surface and the contact location make contact to inhibit unlocking.

As illustrated, each projection 510a, 510b is tapered such it become thinner in the exterior direction. As a result, each projection's external surface 514a and 514b only contacts its corresponding binding arm 524a and 524b across a portion of the external surface 514a, 514b. Such a configuration facilitates rotation of latch 104 when moving between the locked position to the unlocked position.

In the illustrated embodiment, projections 510a and 510b are illustrated as extending perpendicular to external surface of wall 120, respectively, and the tangents $T_A$ and $T_B$ of the contact location 516a and 516b being perpendicular to sidewall 120; however other non-perpendicular orientations of the projections and tangents are possible provided hooks 512a and 512b operate in a manner to inhibit external motion of catch 525 (and as a result inhibit external motion of door 102), and contact locations 516a and 516b inhibit force from the interior of the container from unlocking the latch and opening the door, as described below. In some embodiments, the projections extend generally parallel to or in a same direction as the base or a flat surface on which the base may be located.

It will be appreciated that the inhibition of unintentional unlocking due to pressure on the interior surface of door 102 is believed to be achieved by force of the binding arm which results, in part, from friction occurring between contact locations 516a and 516b, and the contacts surface 527a and 527b, respectively and, in part, from the binding arm applying a force on the projection to prevent the hook from moving with the catch in response to a force from the interior of the door.

As described above, in some embodiments, the contact locations are perpendicular to sidewall. However, deviation from such a configuration is permitted. The amount of deviation is dependent, at least in part, on the relative positioning of the binding arm and the projection as well as the coefficient of friction between the contact location and the contact surface.

A bridge 550 extends between first clasp 520a and second clasp 520b. Bridge 550 is disposed above and separated from actuation bar 540. Bridge [540] *550* adds robustness to latch 104 such that, when actuation bar 540 is pressed, the clasp (including binding arm 524a, 524b) is rotated such that the open position of the latch is more reliably achieved. As illustrated, in some embodiments, bridge 550 is connected to both binding arms 524a, 524b. Typically, the bridge is beam shaped, but may have some curve or contour. In some embodiments, the bridge is separated from the actuation bar to allow an operator of the latch to fit his/her fingers between the bridge and actuation bar. Alternatively, the separation may be smaller to allow actuation tool to fit between the bridge and actuation bar. In some embodiments the separation is between about 1 cm to 2 cm, in other embodiments the separation is between 2 mm to 2 cm.

It is to be appreciated that, in hand-operated use, the latch configuration permits access door opening using a single hand. It is also to be appreciated that the latch configuration and its resistance to accidental opening makes it suited for a light weight, high flexibility plastic containers such as those described in Published PCT Application WO2015134067. For example, such containers weigh under 3 pounds and can hold 40 pounds of bananas.

FIG. 8 is a perspective view of an arrangement of RPCs, each container 100 being as shown in FIG. 1. The arrangement is a 6-down configuration, 8-layer arrangement. The containers are coverless. In the illustrated embodiment, according to aspects of the present invention, a representative one of the containers is shown with its access door 102 open, the door being open to enhance air flow to the interior of the container arrangement. It will be appreciated that opening the door facilitates the escape of heat and ethylene gas generated during the ripening process thus reducing the likelihood of overripening of the produce in the containers of the arrangement. In some embodiments, all of the doors facing the exterior of the arrangement are opened. In other embodiments, only a select few access doors are opened. For example the doors may be opened by an operator at a retail store. In some embodiments, the doors have latches according to aspects of the present. It will be appreciated that, the coverless containers and the open doors can substantially reduce the effort needed to enhance the airflow to the bananas in the containers over cross-stacking procedure used with corrugated cardboard boxes The one-hand operation of the latches facilitates the door opening process. While the opening of doors was discussed with reference to a pallet with 48 containers thereon, it will be appreciated that a pallet may be delivered to a retail store with fewer containers, and aspects of the present invention may be used with pallets having fewer containers.

Figure 9:
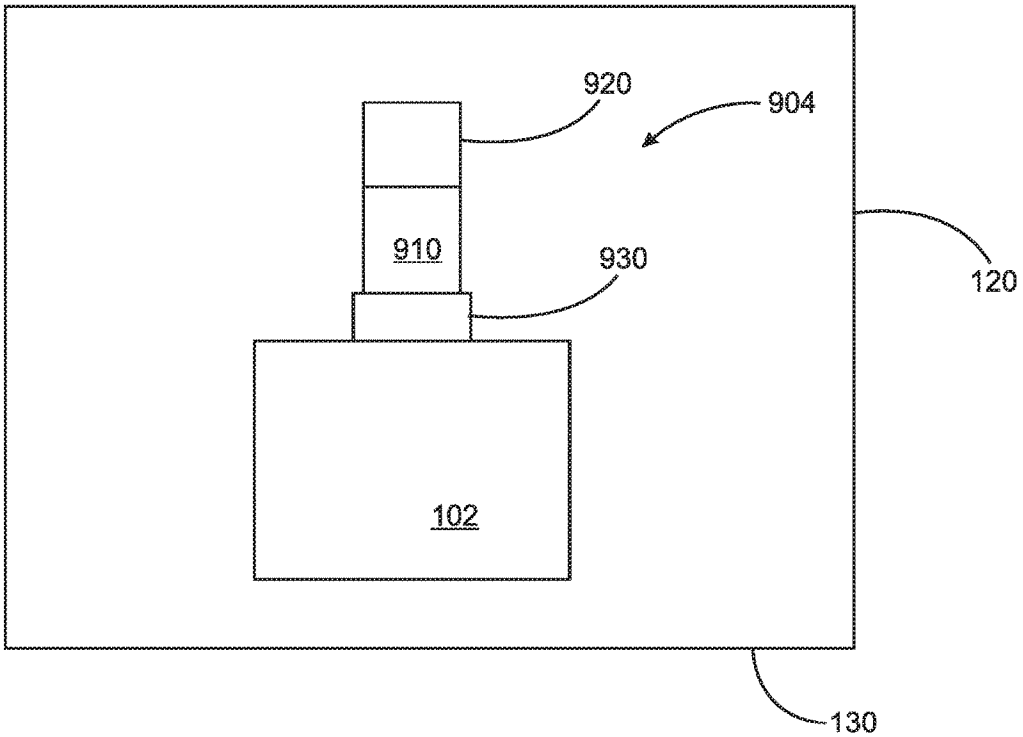
FIG. 9 is a schematic side view of an example of a reusable plastic container (RPC) having an access door and a latch having a single clasp according to aspects of the present invention.

FIG. 9 is a schematic side view of an example of a reusable plastic container (RPC) having an access door 102 and a latch 904 having a single clasp 920 according to aspects of the present invention. As with the embodiments described above, the container comprises two endwalls 110 (as shown in FIG. 2), two sidewalls 120, and a base 130. However, the latch comprises a single clasp 920. Accordingly there is only a single projection 910 extending transverse to an exterior surface of wall 120. Latch 904 is coupled to the door by a spring 930, the latch need only comprise a single catch. The single clasp has a construction and operation similar to that described above (with reference to FIGS. 5-7). It will be appreciated that an actuation bar and a bridge are not needed. Actuation of the clasp can occur by direct contact with the clasp. Alternatively an actuation bar may be coupled to the clasp to facilitate movement of the single clasp to an unlocked state.

What is claimed is:

1. A produce container having an interior for maintaining produce, comprising:

A) a base, two endwalls and two sidewalls, each of the endwalls and sidewalls being coupled to the base, at least one of the sidewalls *or endwalls* having a first projection and a second projection, each projection extending transverse to an exterior surface of the at least one [sidewall] *of the sidewalls* or [endwall] *endwalls*, each projection comprising i) a hook and ii) an external surface opposite the hook including an external contact location having a tangent that is transverse to the [wall] *at least one of the sidewalls and the endwalls*, the hook extending in a direction away from the contact location, the contact location being disposed interiorly of the hook;

B) [a] *an access* door movably coupled to *the at least one of* the [sidewall] *sidewalls* or [endwall] *endwalls*, the *access* door movable from a closed position to an open position;

C) a latch coupled to the *access* door by at least one spring at an end of the door, the latch comprising a) a first clasp and a second clasp, each comprising i) a catch and ii) a binding arm connected to the catch and having a contact surface, for each clasp [,] the catch being separated from the contact surface by a distance so that a corresponding one *of* the first projection and second projection fits between the catch and the contact surface when the door is in a closed position, the first clasp and the second clasp being separated from another along the end, b) an actuation bar extending between the first clasp and the second clasp, and c) a bridge extending between the first clasp and the second clasp, and separated from the actuation bar, the latch having a locked position in which the catches interface with their corresponding hooks to maintain the door in the closed position and prevent [the] external motion *from the closed position to the open position*, and an unlocked position in which the door is externally movable from the closed position to the open position, the at least one spring biasing the latch into the locked position, and configured such that sufficient pressure on the actuation bar overcomes the biasing to move the catches to [an] *the* unlocked position in which the catches do not interface with the corresponding hooks, thereby allowing the door to externally rotate to attain the open position, when the latch is in the locked position, each of the contact surfaces facing its corresponding contact location.

2. The container of claim 1, wherein each of the endwalls and sidewalls is coupled to the base by at least one hinge.

3. The container of claim 1, wherein the access door is coupled to a sidewall.

4. The container of claim 1, wherein the hooks extend downward.

5. The container of claim 1, wherein the access door is coupled to the at least one of the endwalls and the sidewalls by at least one hinge, whereby the door is moved between the closed position and the open position by external rotation.

6. The container of claim [1]*5*, wherein the [hinges are] *at least one hinge is* connected to a bottom end of the access door.

7. The container of claim 1, wherein the contact locations are substantially perpendicular to the at least one of the sidewalls and the endwalls.

8. The container of claim 1, wherein the actuation bar and the bridge are separated from one another by about 2 mm to *about* 2 cm.

9. The container of claim 1, in a combination with a plurality of other containers to form an arrangement on a pallet.

10. The container of claim [1]*9*, wherein the arrangement is a multilayer 6-down arrangement.

11. A produce container having an interior for maintaining produce, comprising:

A) a base, two endwalls and two sidewalls that are each coupled to the base, at least one of the endwalls and sidewalls having a projection extending transverse to an exterior surface of the at least one of the endwalls and sidewalls, the projection comprising i) a hook extending from a surface thereof and ii) an exterior surface opposite the hook including an external contact location having a tangent that is transverse to the at least one of the endwalls and sidewalls, the hook extending in a direction away from the contact [surface] *location*, the contact location being disposed interiorly of the hook;

B) a door movably coupled to the at least one of the sidewalls or endwalls, the door movable from a closed position to an open position;

C) a latch, coupled to the door by a spring, the latch comprising i) a catch and ii) a binding arm connected to the catch and having a contact surface, the contact surface separated from the catch by a distance such that the projection fits between the catch and the contact surface when the door is in the closed position, the latch having a locked position in which the catch interfaces with the hook to maintain the door in the closed position, and an unlocked position in which the door is movable from the closed position to the open position, the spring biasing the latch into the locked position when the door is in the closed position, and sufficient pressure on the latch overcoming the biasing to move the catch to [an] *the* unlocked position in which it does not interface with the hook, thereby allowing the door to attain the open position, when the latch is in the locked position, the contact surface facing the contact location.

* * * * *